United States Patent [19]

Hartmann et al.

[11] 4,299,162
[45] Nov. 10, 1981

[54] CONTROLLED DEFLECTION ROLL SYSTEM

[75] Inventors: Werner Hartmann; Karl-Heinz Küsters, both of Krefeld-Forstwald, Fed. Rep. of Germany

[73] Assignee: Eduard Küsters, Krefeld, Fed. Rep. of Germany

[21] Appl. No.: 140,679

[22] Filed: Apr. 16, 1980

[30] Foreign Application Priority Data

Oct. 29, 1979 [DE] Fed. Rep. of Germany ....... 2943644

[51] Int. Cl.³ ..................... B30B 15/26; B30B 3/04
[52] U.S. Cl. ............................ 100/43; 100/47; 100/162 B; 100/170; 29/116 AD
[58] Field of Search ........... 100/43, 47, 162 R, 162 B, 100/163 R, 168, 169, 170; 29/113 AD, 116 AD

[56] References Cited

U.S. PATENT DOCUMENTS

| | | | |
|---|---|---|---|
| 3,338,157 | 8/1967 | Grandinetti et al. | 100/47 |
| 3,527,159 | 9/1970 | Edwards | 100/170 |
| 4,074,624 | 2/1978 | Biörnstad et al. | 29/116 AD |
| 4,167,964 | 9/1979 | Flury | 29/116 AD |
| 4,206,700 | 6/1980 | Stotz et al. | 29/116 AD |

FOREIGN PATENT DOCUMENTS 2639353 3/1978 Fed. Rep. of Germany ........ 29/116 AD

Primary Examiner—Peter Feldman
Attorney, Agent, or Firm—Kenyon & Kenyon

[57] ABSTRACT

A controlled deflection roll system includes a rotative cylindrical shell having an outside adapted to form a nip with a counter roll, a non-rotative shaft extending axially through and radially spaced from the shell's inside and having projecting ends to which force is applied to press the shell against the counter roll. Inside the shell pressure elements press the shell in the same direction, the counter roll providing a reaction, and because the shell does not have its ends journaled on the shaft, the shaft can float inside the shell in dependence on the forces involved. Automatic devices automatically responsive to any radial displacement of the shaft relative to the shell control the force applied to the shaft's ends so as to keep the shaft centered at its ends within the shell, permitting the application of a rotary drive to the shell.

4 Claims, 4 Drawing Figures

CONTROLLED DEFLECTION ROLL SYSTEM

BACKGROUND OF THE INVENTION

A controlled deflection roll of the type schematically shown by the Appenzeller U.S. Pat. No. 2,908,964, Oct. 20, 1959, permits the rotative roll shell to float relative to the fixed stationary shaft extending through the shell. The relative positions of the shell and shaft are determined by the relative forces of the roll nip pressure and the hydraulic pressure between the shaft and the shell.

The Kusters U.S. Pat. No. 3,023,695, Mar. 6, 1962, shows that the externally extending ends of the controlled deflection roll shaft can be provided with hydraulic pressure elements applying force to the roll in the direction of the counter roll, and in this case it would be possible for the shaft itself to float radially inside the shell in dependence on the shell's internal pressure and the force applied to the extending ends of the internal shaft. To prevent this, this patent shows the use of self-aligning anti-friction bearings between the ends of the shaft and the roll shell.

In both of the above patents, the pressure rolling nip line pressure is uniformly transmitted to the shaft from the roll shell via a sealed body of hydraulic liquid between the shaft and shell and extending for the length of the roll on its side forming the nip with the counter roll.

By mechanically fixing positions of the ends of the stationary shaft coaxially within the shell roll, deflections of the roll shell and shaft occurring during the roll's operation are reflected only very slightly at the shaft ends and are only small angular deflections of the shaft ends relative to the roll shell ends.

In modern versions of such controlled deflection rolls it is desirable to be able to rotatively power the shell. Such a drive typically comprises an arrangement for locking the shaft against rotation at one end and providing its other end with a triple-race bearing, having an inner race non-rotatively engaging the shaft end, and outer race on which the shell rotates, and a power driven intermediate race coupled to the end of the roll shell by a drive coupling accommodating the slight angular deviations of the shaft's end outside of the bearing between the shaft and the shell.

Although such a coupling can handle the relatively small angular shaft end deviations involved by a controlled deflection roll having end bearings, it cannot operate under the larger bodily displacements involved by the shaft and its ends of a controlled deflection roll which does not use the end bearings and which permits the shaft to bodily displace in dependence on the play of the forces involved.

Instead of the longitudinally extending sealed body of hydraulic fluid working against the shell's inside to provide the characteristic uniform pressure lengthwise between the shaft and shell's inside, it is possible to provide the shaft with cylinders containing pistons bearing against the shell's inside via appropriate bearing shoes. With the cylinders provided with the same pressure, a uniform force is provided lengthwise throughout the extent of the roll. An example of this is schematically shown by the Kusters et al U.S. Pat. No. 3,131,625, May 5, 1964.

A roll not using end bearings has an advantage in that roll deflection is controlled throughout the entire length of the roll shell. It also has an advantage in that it permits a particularly sensitive adjustment of the nip line pressure and can keep this line pressure uniformly throughout the length of the shell even though the counter roll against which the roll shell works, itself deflects. The floating roll shell can deflect throughout its entire length to match the beam deflection of the counter roll. In some instances, the counter roll may be another controlled deflection roll.

The object of the present invention is to permit the use of the drive which heretofore could be used only for the controlled deflection roll having end bearings between the roll shell and shaft, so as to drive the shell of the type of controlled deflection roll which does not use end bearings.

SUMMARY OF THE INVENTION

The above object has been attained by forming the controlled deflection roll of the type not using the end bearings, into a system by providing automatic means automatically responsive to the radial displacement of the shaft ends relative to the shell for controlling controllable means applying the nip pressure to the shaft's ends so as to hold the shaft at a predetermined position radially relative to the shell. Such a position can be concentric with the shell's end so as to permit the use of the drive for the rotative shell which could previously be used only when the end bearings are involved.

Normally the shaft's ends would receive the force for the nip pressure via hydraulic cylinders and pistons and the force would be applied to both ends of the shaft. A suitable supply of controllable hydraulic pressure can be used to control the force or pressure applied to the pistons working against the stationary shaft's ends, such control being actuated in each instance by relative small valves installed in the shaft's ends and actuated by feeler pins engaging the shell's inside ends directly or preferably via bearing arrangements which do not anchor the shaft and shell together in the direction of the nip.

DESCRIPTION OF THE DRAWINGS

The accompanying drawings schematically illustrate the principles of the present invention, the various views being as follows.

DETAILED DESCRIPTION OF THE INVENTION

Figure 1:
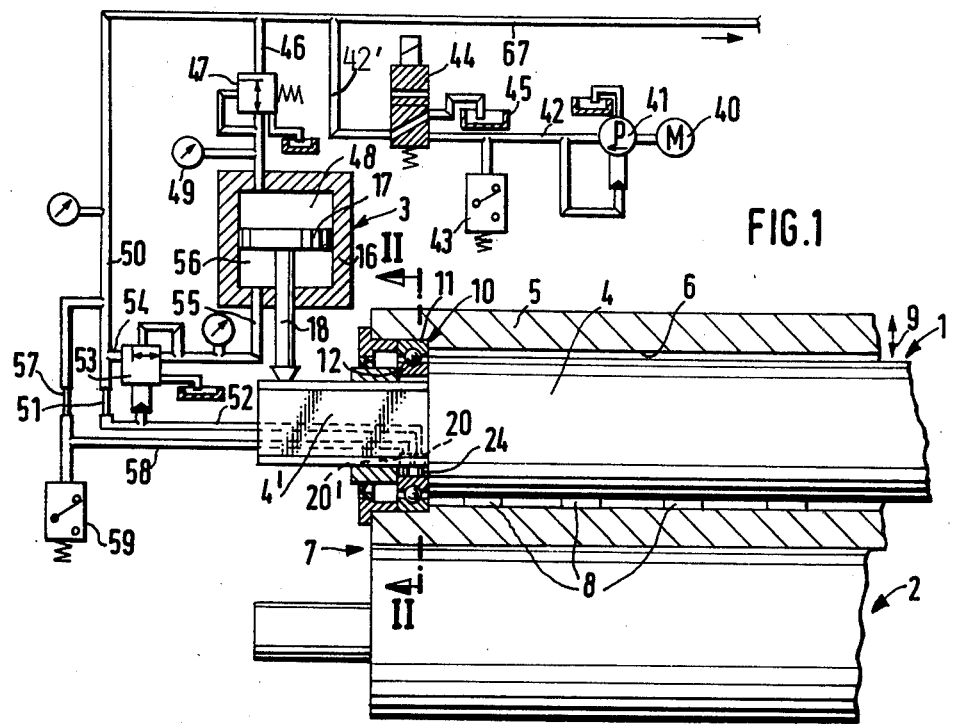
FIG. 1 shows in longitudinal section one end portion of a controlled deflection roll of the full floating type, together with the equipment making up the system for holding this end of the shaft concentric with that end of the roll shell.

In these drawings a controlled deflection roll 1 works against a counter roll 2 to form a pressure-rolling nip. The counter roll 2 is, in this instance, a solid roll having its ends fixed against radial displacement by bearings (not shown). The nip pressure is applied by means 3 for applying variable force to the shaft's ends in a direction towards the nip and as required to provide the desired nip line pressure.

In the following it is to be understood that the system to be described should normally be applied to both ends of the roll 1, although to accommodate a conventional roll shell drive it is needed at only one end.

The roll 1 comprises a stationary shaft 4, sometimes called a core, which extends lengthwise through the cylindrical roll shell 5 which externally forms the nip with the counter roll, the shaft having externally projecting end 4' receiving the force from the means 3. The roll shell has a cylindrical inside 6 which is radially spaced from the shaft 4 as required to permit relative radial movement of the shaft relative to the shell. This permits the characteristic deflection of the shaft 4 while the shell 5 conforms to the shape of the counter roll 2 regardless of the latter's deflection.

Uniform pressure can be applied to the pressure rolling nip 7 via pressure shoes indicated at 8, the pressure applying details not being illustrated because the principles of the previously mentioned Kusters et al U.S. Pat. No. 3,131,625 can be used. The shoes 8 each apply the same force directed radially from the shaft 4 to the inside 6 of the shell. The shaft 4 deflects during operation of the roll and the radial space between it and the inside of the shell must permit this displacement without interference.

The shaft 4 and roll shell 5 are radially displaceable relative to each other in the direction or plane of the nip 7 which is vertical in FIG. 1. However, the shell and shaft are guided or held so as to prevent transverse or horizontal movement.

This is done by an anti-friction bearing having an outer race 11 fixed to the inside of the shell 5 at or adjacent to its end. The inner race 12 of this bearing is connected on its horizontally opposite sides, at right angles to the plane of the nip roll, to bearing shoes 13 which slide on flat sides or flanks 14 of the shaft's end 4'. These flats are in planes parallel to that of the nip so as to permit relative sliding between the shoes and the shaft in the direction of the arrows 15 in FIG. 2.

In other words, relative vertical movement between the ends of the shaft 4 and the shell 5 is free to take place, but displacement at right angles or horizontally it prevented. Thus, the advantages of a full floating controlled deflection roll are maintained, while involving the problem that the relative positions of the shaft and roll ends are dependent on the proportioning of the forces exerted by the shaft end loading arrangement 3 and of the shoes 8, when the roll shell 5 forms a pressure rolling nip with the lower roll 2.

It should be noted that vertical motion of the shaft ends is possible to the substantial extent required for the shell 5 to fully float throughout its length because there is a substantial radial space formed between the tops and bottoms of the shaft ends and the inside of the inner race 12 of the bearing 10. Normally both ends of the roll are mounted in the same fashion and both are provided with the system described below. This system is under the control of a detector which responds to radial displacement of the shaft end and shell end. The detector is preferably positioned in vertical alignment with the plane of the nip because the relative displacement between the shaft and shell is greatest there.

Each detector is in the form of a valve 20 positioned in a blind bore 21 in the shaft end and directly in line with the vertical plane established by the roll nip. A cylindrical valve body 22 is positioned in this bore and is formed with a coaxial hole 23 in which a feeler pin 24 is reciprocatively positioned. A compression spring 25 between this feeler pin and the closed end of the blind bore 21 biases the feeler pin to press outwardly against the inside of the inner race 12 of the bearing 10. This inner race is non-rotative so no friction is involved between the inner race and the feeler pin.

The hole in which the feeler pin slides is enlarged at the top end of the pin to form a chamber 27. The end of the hole 23 directly above the chamber 27 forms a right angular peripheral edge 28 which cooperates with a right angular control edge 29 formed by the right angular top or end face of the feeler pin 24, to provide a valve action. If the feeler pin is pressed upwardly into the hole 23 against the spring 25, the pin's end face or edge 29 is moved beyond the control edge 28 and prevents the passage of pressurized control fluid which can be otherwise fed by a feed line 26 to a run-off port 30 in the body 22. However, if the shell and shaft end relatively displace so that the bearing's inner race 12 moves downwardly relative to the shaft, the control edge 28 enters the chamber 27, and more or less of the pressurized fluid can flow into the run-off 30 from where it can flow off via a slot 31 in the side of the part 22 and into the inside of the shell. At the control edge 28, therefore, a variable choke point is formed, the effectiveness of which depends on the position of the feeler pin 24. The feeler pin movement is very small, amounting to only a few hundredths of a millimeter. An accurate and precise detector is thus provided.

The detector 20 controls the pressure in the shaft end loading device 3 which is shown as being formed by a cylinder 16 containing a piston 17 which presses its piston rod 18 on the projecting end 4' of the shaft 4.

This control is effected by the hydraulic system shown by FIG. 1 and described below.

A motor 40 drives a hydraulic pump 41 which delivers into a line 42, in which an overpressure shut-off valve 43 is connected. The line 42 is further provided with an ON-and-OFF valve 44 by means of which pressure can be admitted to the loading devices 3 or by which the pressure in the system can be vented into the sump 45. With the valve 44 switched on, the pump flow arrives via the line 46 and the maximum-pressure valve 47 at the head end 48 of the cylinder 6. The pressure there can be read by a manometer 49. It corresponds to a definite force on the end 4' of the shaft core 4. The full pump pressure furthermore gets via a line 50 and a choke point 51 to the valve 20. The pressure in the connecting line 52 between the choke point 51 and the valve 20 depends on the choke effect of the valve 20. If the latter is large, the pressure in the line 52 practically corresponds to the full pump pressure; if it is low, the pressure drops rapidly because of the choke 51. The pressure in the line 52 controls a valve 53 which is connected via a line 54 to the line 50 which carries the full pump pressure, and allows a portion of the pressure in the line 50 corresponding to the pressure in the line 52 to get via the line 55 into the space 56 below the piston of the cylinder 16, where it counteracts the pressure in the head end 48.

If, therefore, the shaft's end is positioned too low, the feeler pin is pushed into the core 4 too deep and closes the choke point at the control edge 28 so that the pressure in the line 52 rises and a correspondingly large portion of the full pressure in the line 50 gets into the piston od end 56 of the cylinder 16. This reduces the force exerted by the loading unit 3 and the shaft 4 moves somewhat upwardly under the action of the force exerted by the shoes 8. In this manner, an equilibrium is established which holds the core with a deviation of fractions of a millimeter in a predetermined position within the hollow cylinder 5.

In addition to the valve 20, a second valve 20', not shown in detail, is preferably provided which is connected via a choke 57 and line 58 to the full pressure in the line 50. The pressure in the line 58 can act upon a safety switch 59 which stops the pump if a predetermined pressure is exceeded.

The entire arrangement should be also provided on the opposite side of the roll and supplied there with pressurized fluid via the line 67.

Figure 3:
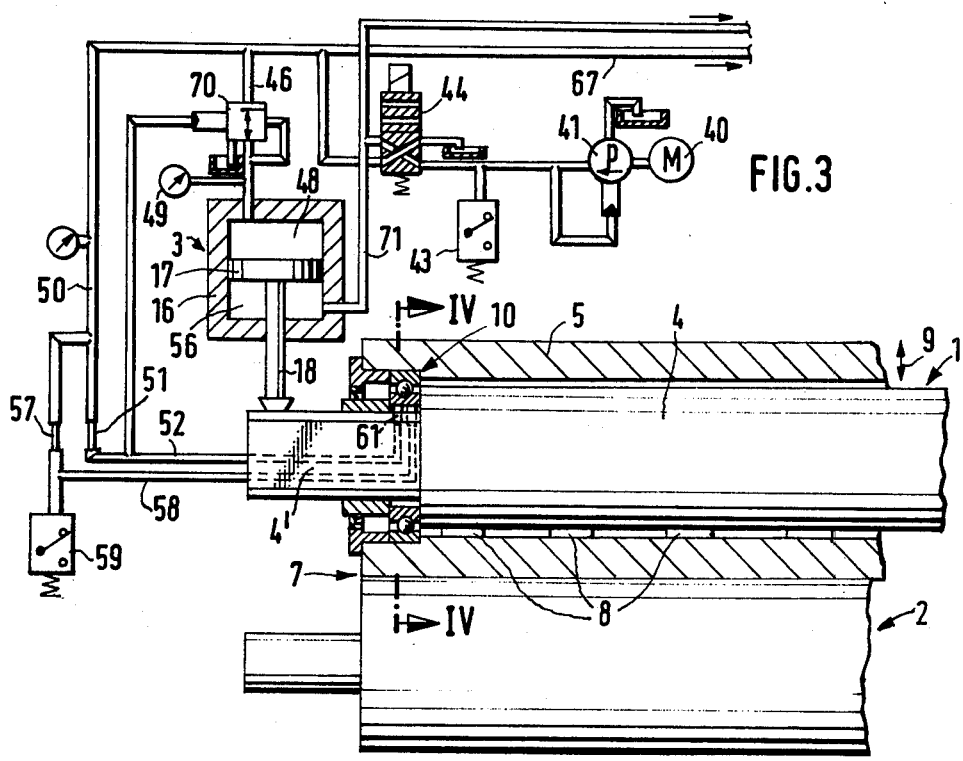
FIG. 3 is the same as FIG. 1 but shows a modification.
Figure 2:
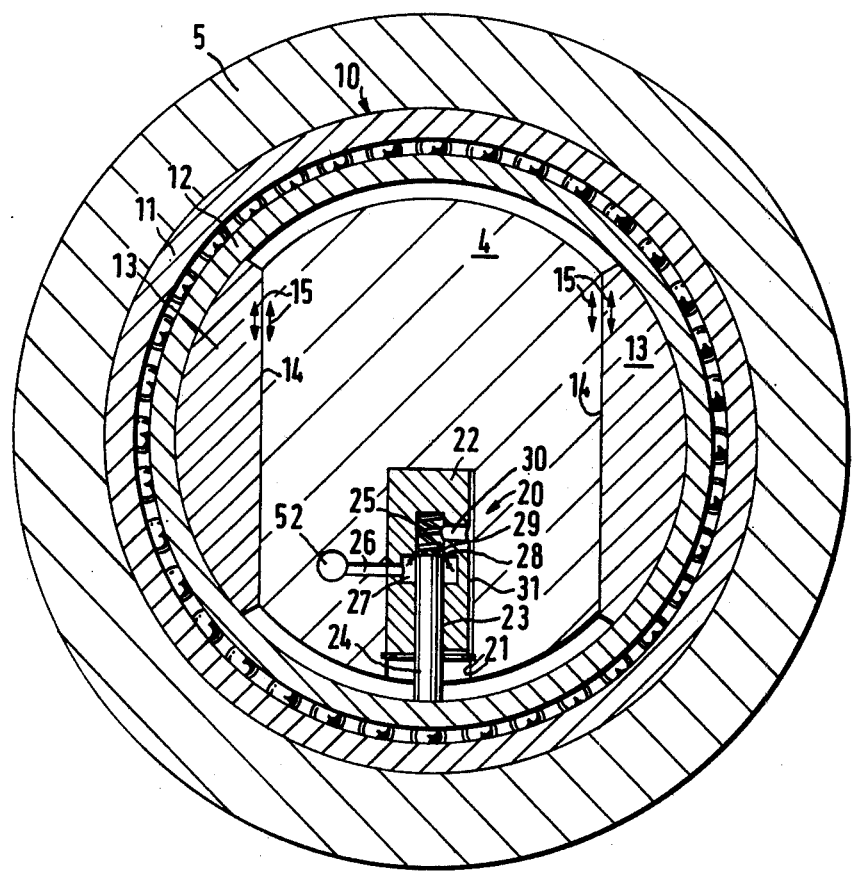
FIG. 2 is a cross section taken on the line II—II in FIG. 1.
Figure 4:
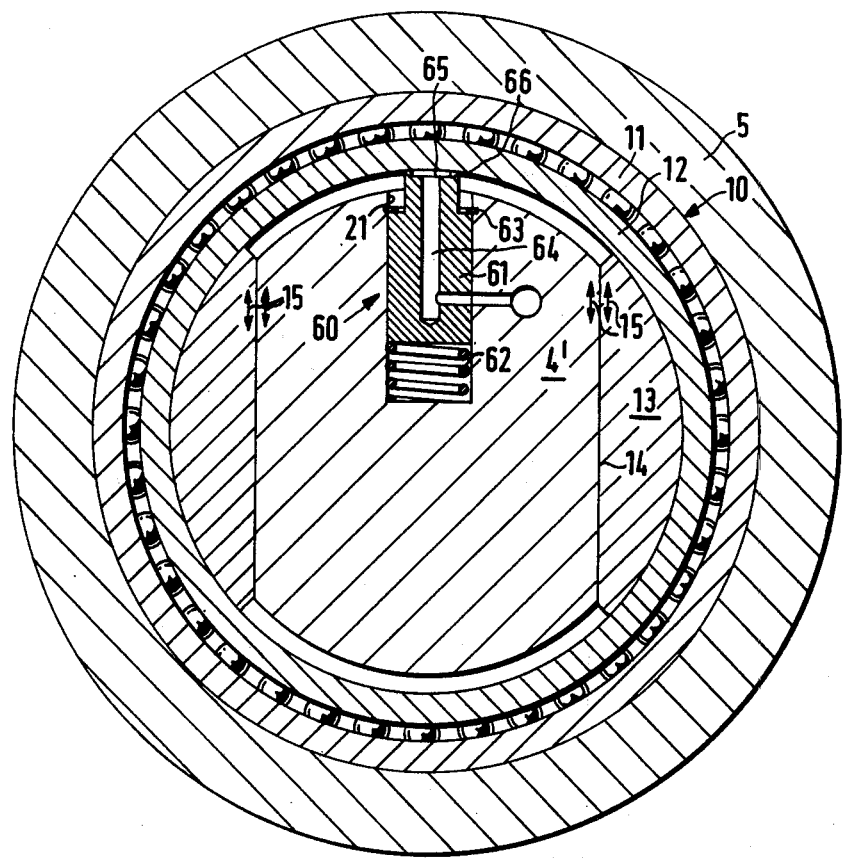
FIG. 4 is a cross section taken on the line IV—IV in FIG. 3.

In the embodiment examples of FIGS. 3 and 4, parts which have remained the same, are designated with the same numerals used in FIGS. 1 and 2. The control element or detector 60 in this case comprises a valve spindle 61 which is arranged in the bore 21 of the core 4 (FIG. 4) and is pushed outward until it makes contact with a snap ring 63 via a spring 62 and if necessary allows the valve spindle 61 to give way. The valve spindle 61 has a lengthwise bore 64, which is in communication with the feed line 52 for the pressurized control fluid, and the spindle bears against the inner race 12 of the anti-friction bearing 10 via an expanded chamber 65 which is closed off by a rim 66 which is closed all around and makes sealing contact with the inside circumference of the inner race 12.

If the shell 5 and therewith, the inner race of the antifriction bearing 10, is displaced upward according to FIG. 4, a gap opens up at the rim 66, since the valve spindle 61 cannot follow because of the snap ring 63. Therefore hydraulic fluid passes from the feed line 52 into the interior of the shell 5, and the pressure in the feed line 52 drops. If the shell is displaced downwardly according to FIG. 4, the choke passage at the rim 66 is closed and the pressure in the feed line 52 rises accordingly. A correspondingly high portion of the total pressure in the line 46 is conducted via the valve 70 into the head end 48 of the loading device 3 and acts directly on the shaft 4. With the valve 44 switched on, the piston rod end 56 is vented.

If, therefore, the shaft end 4' in FIG. 3 is positioned too low and the choke action at the rim 66 is correspondingly weak, the pressure in the line 62 drops and therewith also the pressure in the head end 48 of the device 3, so that the core 4 can be lifted up by the action of the shoes 8. Equilibrium adjusts itself in a manner similar to that described in connection with FIG. 1.

What is claimed is:

1. A controlled deflection roll system comprising a rotative cylindrical shell having a cylindrical inside and a cylindrical outside adapted to form a nip with a counter roll, a non-rotative shaft extending axially through and radially spaced from the shell's inside and having projecting ends extending beyond the shell's ends and free to radially displace relative to the shell in the direction of the nip, controllable means for applying variable force to the shaft's extending ends in a direction towards the nip, means for applying in said direction uniformly throughout the roll's length force transmitted from the shaft to the roll's inside, and automatic means automatically responsive to radial displacement of at least one end of the shaft relative to the shell for controlling said controllable means so as to hold the shaft at a predetermined position radially relative to the shell when the shell's outside forms a nip with a counter roll.

2. The system of claim 1 in which said automatic means includes detector means for detecting said radial displacement at a position between the shaft and shell which is substantially aligned with said nip.

3. The system of claim 2 in which at least said one end of the shaft has flat sides parallel to said direction and slidably engaged by shoes journaled to the shell's inside by an annular anti-friction bearing encircling the shaft and having an inner non-rotative race radially spaced from the shaft and engaged by the shoes, said detector means being positioned between the shaft and said non-rotative race.

4. The system of claim 3 in which said controllable means is a double-acting piston in a cylinder, and said detector means is a fluid valve actuated by radial displacement of said shaft relative to the bearing of said non-rotative inner race, said valve controlling the introduction of pressurized fluid to the opposite ends of said cylinder in dependence on said radial displacement.

* * * * *